United States Patent [19]

Falk

[11] Patent Number: 4,522,352

[45] Date of Patent: Jun. 11, 1985

[54] DRIVE AND MOUNTING FOR COAXIAL TAPE REELS

[75] Inventor: Gerhard Falk, Rossdorf, Fed. Rep. of Germany

[73] Assignee: Robert Bosch GmbH, Stuttgart, Fed. Rep. of Germany

[21] Appl. No.: 598,086

[22] Filed: Apr. 9, 1984

[30] Foreign Application Priority Data

Apr. 9, 1983 [DE] Fed. Rep. of Germany ....... 3312817

[51] Int. Cl.³ .......................... G03B 1/04; G11B 15/32
[52] U.S. Cl. ..................................... 242/193; 352/156
[58] Field of Search ............... 242/193, 194, 68, 72 R, 242/72.1, 68.3; 352/156

[56] References Cited

U.S. PATENT DOCUMENTS

| | | | |
|---|---|---|---|
| 3,275,255 | 9/1966 | Pitts | 242/68.3 |
| 3,322,364 | 5/1967 | Dekker | 242/68.3 |
| 3,322,365 | 5/1967 | Martin et al. | 242/68.3 |
| 4,121,786 | 10/1978 | Hathaway | 242/193 |

Primary Examiner—Leonard D. Christian
Attorney, Agent, or Firm—Frishauf, Holtz, Goodman & Woodward

[57] ABSTRACT

Coaxially disposed tape reels are driven independently of each other by motors located inside coaxial hubs on which the reels are held. The mechanisms for loading and unloading the reels include arc-segment-shaped levers pivoted at one end on rings and actuated at the other end in the space between the drive motors and the hub shells to push out their mid portions to provide, in sequence, clamping of the lower reel, provision of a support for the upper reel and clamping of the upper reel, with retraction of the levers in the reverse sequence enabling removal first of the top reel and then of the bottom reel. A grip knob at the top which can be turned relative to one or both of the hubs serves to actuate this mechanism.

2 Claims, 11 Drawing Figures

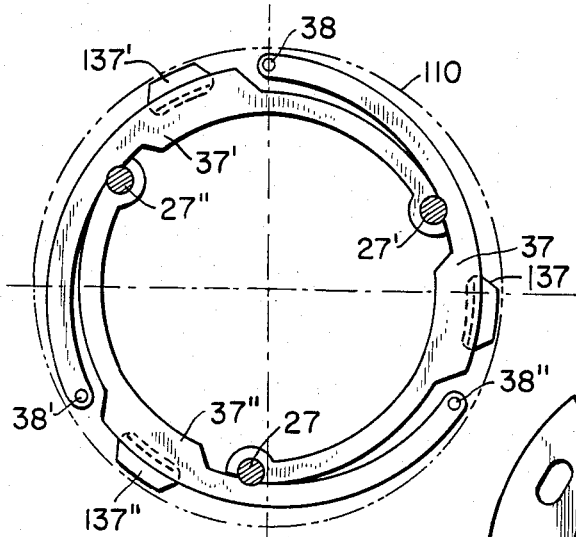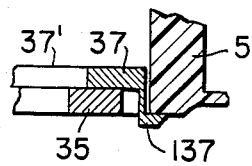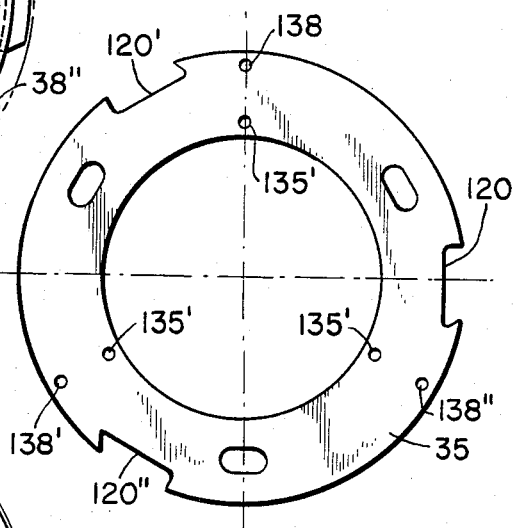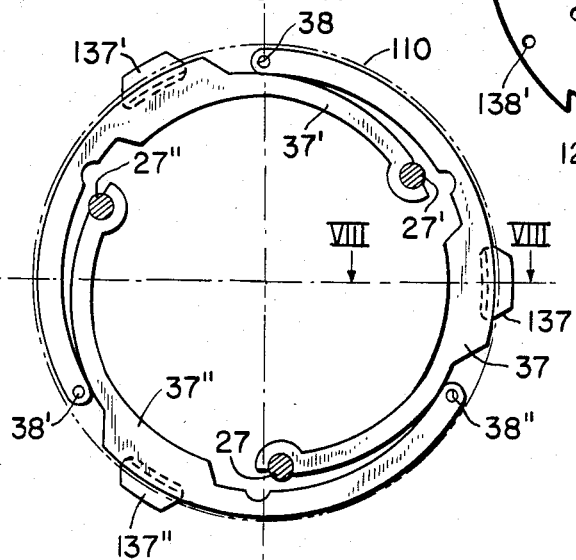

DRIVE AND MOUNTING FOR COAXIAL TAPE REELS

The invention concerns apparatus for mounting and driving coaxially mounted tape reels. Many ways of mounting tape or film supply reels on their drive shafts are known. Some involve fixing in place with force and others simply interlock the reel with a shaft or hub by features of shape and, moreover, there are devices with and without servo-support for holding and driving the supply reels. There are special problems in the case of a coaxial disposition of the tape supply reel where the mechanism for fastening is only accessible from one side and the reels must be made in the same shape. It is often necessary in magnetic taping technology to utilize the reel of magnetic tape equipment alternately as supply reel and as pickup reel. In such a case they must be selectively fixable, without limitation, either on the lower or on the upper hub.

A system for coaxial disposition of two reels mounted independently of each other at a close spacing one from the other is shown in U.S. Pat. No. 3,322,364. This known arrangement has a central actuation device by means of which the two reels can be connected both by force and in interlocking shape with their hubs and, in addition, radially running support members can be moved as needed in a radial direction for holding the upper reel in such a way that the lower reel can slip over these members. A disadvantage of the known mounting arrangement is that the entire internal space of the hub is used up for the actuation of the support and holding members. In the recent times, efforts have been under way to place the hub drives in cavities of the hub itself for reasons of space and weight saving. The known construction just described is quite unsuitable for any such modification.

A similar device is known from German published patent application (AS) No. 28 24 330, in which two special kinds of cavities in the internal bores of the reels must be provided to avoid the need for radially shiftable support members for the upper reel. Along with the increased extent for the manufacture of such a device there is the further disadvantage in the known device that the reels cannot be mounted in either one of the positions and upper and lower reel holding means must be maintained in a quite special relation to each other during the placing of reels on the hub. Furthermore, the internal space of the hubs is not usable for further purposes, such as the seating and clamping of the tape reels.

SUMMARY OF THE INVENTION

It is an object of the present invention to provide a mounting and drive for coaxial tape reels in which the drive motors and their gear trains as well as the mounting controls may occupy space within the reel hub.

Briefly, the clamping elements of both hub structures and the support elements of the upper hub structure are constituted as segment-shaped one-arm levers which extend over approximately half the circumference of the hub. The actuation of the segment-shaped levers takes place at or near their free ends and is produced by a centrally rotatable actuation element.

The invention has the advantage that the supporting-end rotary-motion transmission members of the two reel hubs are in fact actuated centrally although they are preferably disposed peripherally so that the internal space in the hubs remains free for the provision of the drive motors and/or gear drives. There is the further advantage that it is possible to use standard reels without limitation.

It is particularly advantageous that standard reels can be mounted on or taken off the two drive hubs in any rotary position of the equipment. Finally, it is advantageous that the reels do not need to be pushed into place against radially operating clamping forces of spring-pressed clamping plates.

BRIEF DESCRIPTION OF THE DRAWINGS

Further details, such as the location of the pivot points of the one-arm levers and the locking, unlocking and driving components are described below, by way of illustrative example, with reference to the annexed drawings in which:

FIGS. 6 and 7 are top views of the two extreme positions of the support mechanism for the upper reel in the device of FIGS. 1 and 2;

FIG. 8 is a cross-section of a small part of FIG. 7 with a portion of the top reel and of an underlying support ring, and FIG. 9 is a top view of the support ring partially shown in FIG. 8.

DESCRIPTION OF THE ILLUSTRATED EMBODIMENTS

Figure 1:
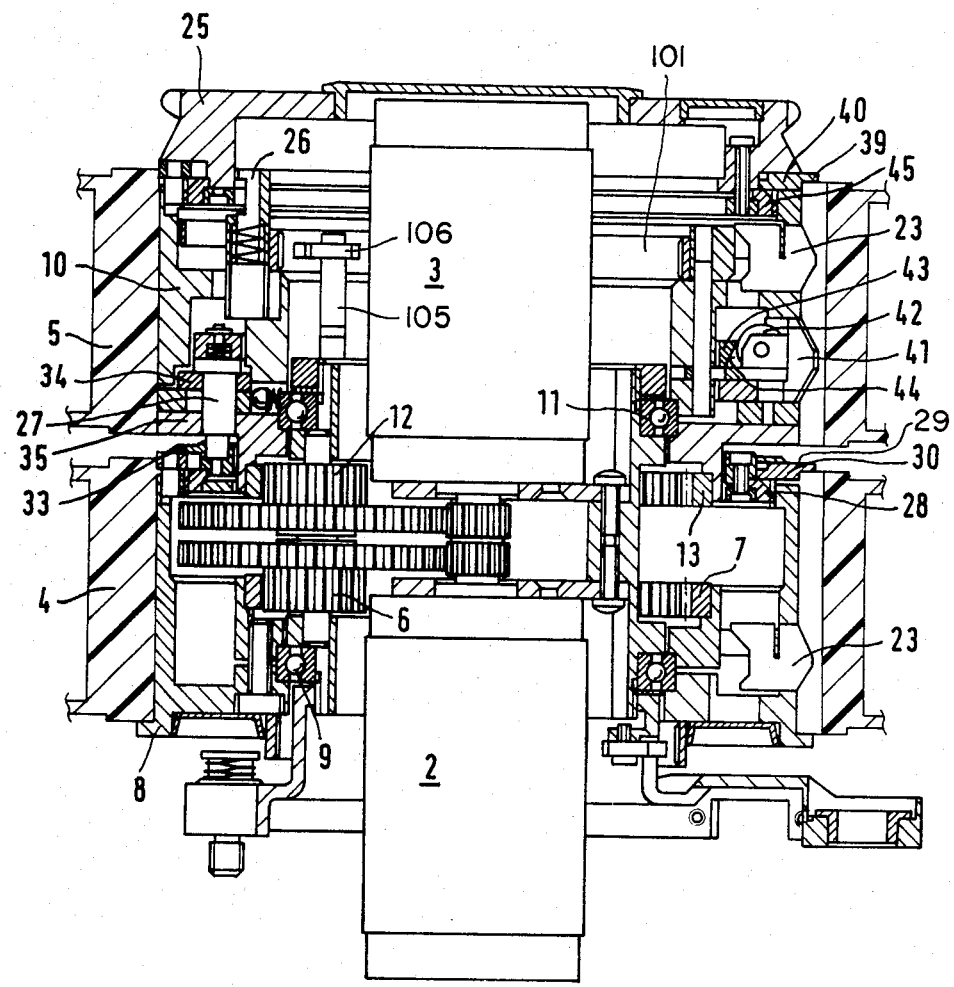
FIG. 1 is a side view, mostly in cross-section, of the mounting and drive of the invention with tape reels mounted in place and arrested firmly in position, both axially and with respect to rotation on their respective hubs.

In the center of the drive and mounting device of FIG. 1 are the two drive motors 2,3 respectively for the "lower" tape supply reel 4 and the "upper" pickup reel 5. The motor 2 drives an innerly toothed ring 7 through a gear train 6. The ring 7 is fixed in place for rotation with the lower hub 8, which, in turn, is mounted for rotation on the ball bearings 9. In a similar way, the upper hub body 10 is mounted on the ball bearings 11 and is driven by the motor 3 through gears 12 and the inwardly toothed ring 13.

Figure 2:
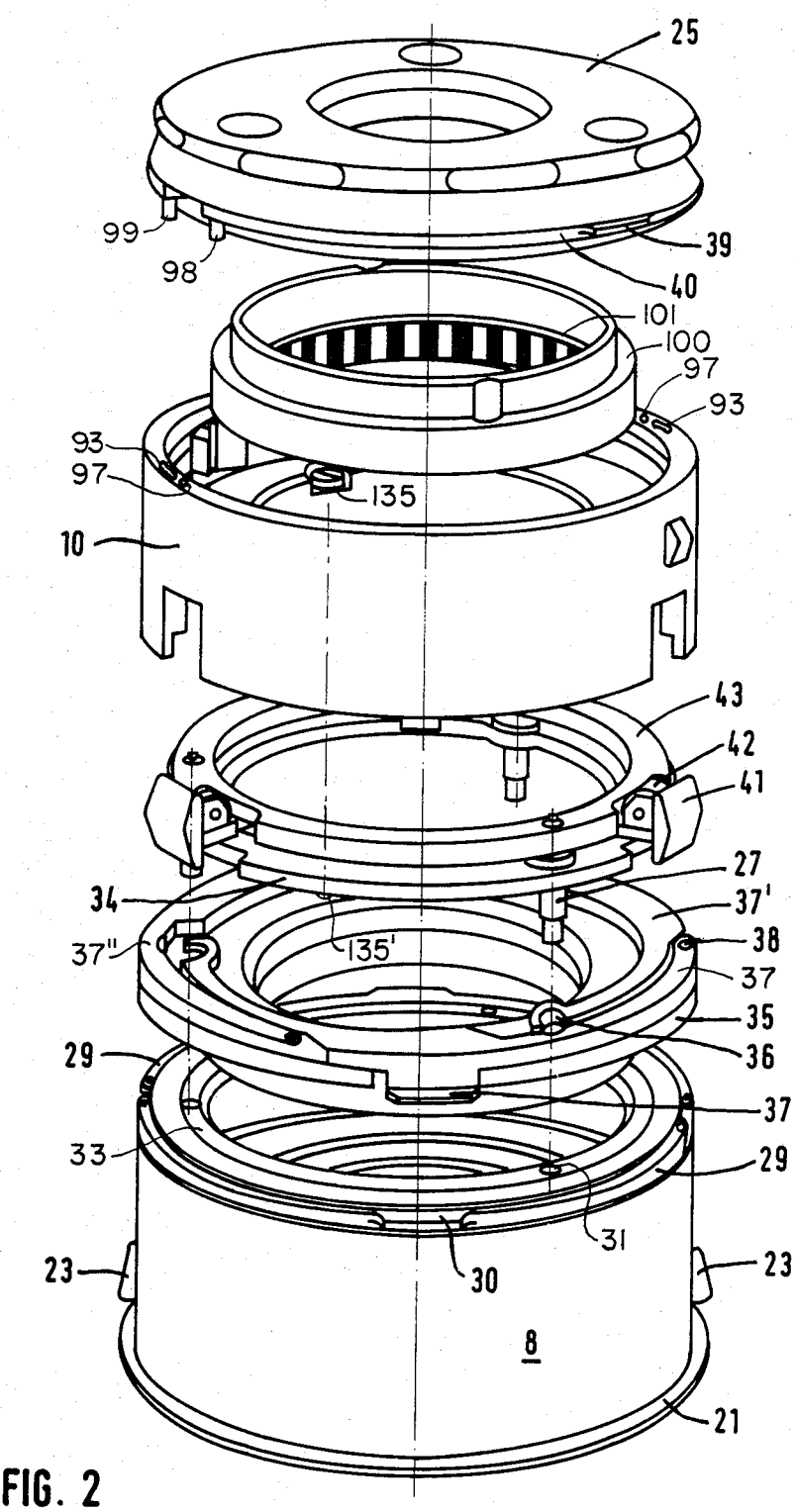
FIG. 2 is an exploded view of the component parts that participate in fixing and supporting of the tape reels.

The construction and manner of operation of the drive and fastening system will now be further described with reference to FIGS. 2-5 as well as FIG. 1. FIG. 2 shows the principal parts of the device of the invention in perspective in a so-called exploded view. It can be seen from this view that the individual component groups, both those which are fixed and also the variable seating and clamping arrangements, are so disposed and actuated that there is sufficient room in the region of the axis of symmetry for locating the drive motors and gears for transmission of the rotary movement from the motors to the mounting mechanism and then to the reels.

Figure 5C:
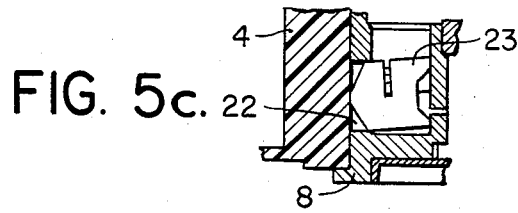
FIG. 5c is a detail of the end of that ring diametrically opposite the end shown in FIG. 1.
Figure 5A:
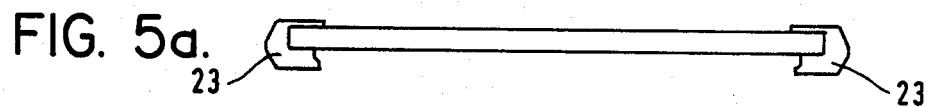
FIG. 5a is a side view and FIG. 5b is a top view of one of the two spring rings shown in FIG. 1.
Figure 5B:
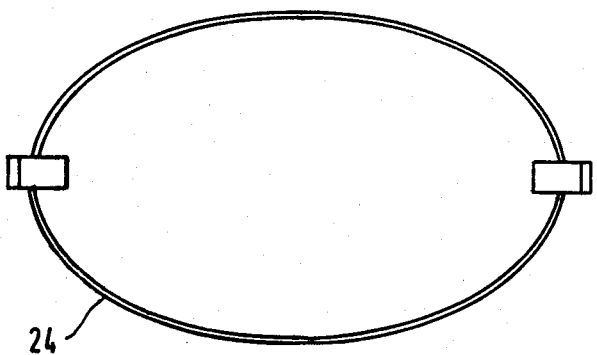

The lower hub 8 of substantially drum-shaped constitution has a lower supporting flange 21 on which the tape reel 4 can be seated. The standard reel has, on the circumference of its central bore, three equidistant grooves running in the axial direction. In order to prevent that, in the case of the arresting arrangements described further below, the reel 4 should rotate on the hub 8, the hub 8 has two diametrically opposite slots 22, into each of which a blocking fin 23 which can be slid radially is disposed (see FIGS. 1, 2 and 5). The two blocking pins 23 are fastened on a ring 24 of spring steel that is ovally preshaped, as shown in FIG. 5b. When the ring 24 with its blocking fins 23 is mounted in the hub 8 the oval ring 24 is deformed approximately to circular shape, so that a radially outwardly directed spring bias force is provided behind both of the blocking pins 23.

For fastening the lower tape 4 on the hub 8, the reel 4 is first pushed down over the hub 10 onto the hub 8, until it comes to lie against the projecting rim flange 21. Then, while the reel edge is held fast, the central grip 25 at the top of the assembly is turned clockwise while the hub 10 is turned with it by virtue of the interposition of the two interlock pins 26. Three more longitudinally movable locking pins 27 connect the hub 10 with the interlock mechanism for the reel 4 on the hub 8, which has its outer circumference engaged in an internal threading of the hub 8. At first the two semicircular hold-down elements 29 (FIG. 3) are spread outwardly so that their cams 30 press on the upper reel-edge and then they are depressed by further rotation because of the pitch of the internal threading, as the result of which the reel 4 is clamped fast against the hub 8.

The ring 34 (FIG. 2) is held fast together with the hub 8 by the projection of the locking pins 27 into bores 31 of the ring 33 (FIG. 3) which is screwed fast to the ring 28 (FIG. 1).

While the actuating ring 35 continues to be rotated by a predetermined angular amount along with the upper hub, the locking pins 27 engage in hook-shaped cavities 36 of the segments 37 which are seated on the ring 35 and pivoted at 38. By the relative angular movement between the stationary hook-shaped cavities 36 and the pivots 38 of the segments 37, those segments are swung outward beyond the circumference of the hub 10. FIGS. 6 and 7 show the two extreme positions of the three levers just mentioned. In these figures the three levers are separately designated 37,37' and 37''.

These three levers are respectively pivoted on pins 38, 38', and 38'' that fit in the holes 138, 138' and 138'' of a support ring 5 shown in FIG. 9. The ring 35, as shown in FIG. 2 is screwed on to the hub 10 by three screws 135, which screw into threaded bores 135' in the ring 35. In their respective mid portions the levers 37,37' and 37'' have integral brackets 137, 137' and 137'' which extend down into the peripheral notches, 120, 120' and 120'' respectively of the ring 35 and then extend outward slightly below the level of the bottom of the ring 135 for seating the reel 5 when the levers 37, 37' and 37'' are in their radially outward positions shown in FIG. 7. FIG. 8 is a cross-section through one of these brackets, the bracket 137 in its extended position.

In FIGS. 6 and 7 the circle 110 indicates the inner diameter of the reel 5 which is essentially the same as the outer diameter of the hub 10 onto which the reel 5 slides into place.

In FIG. 6 the pins 27, 27' and 27'', fixed on the rings 34,43 (FIG. 2), are in their extreme clockwise position, so that the semicircular segment levers 37, 37' and 37'' are swung into their most inward positions, retracting the brackets 137, 137' and 137'' within the circle 110. In FIG. 7, the pins 27, 27' and 27'' have been swung into their most counterclockwise position relative to the rings 35, but this is actually done by moving the hub 10 and the ring 35, with it, clockwise, while the rings 34 remain held fast to the hub 8 by virtue of the pins 27 passing through the bores 31 of the ring 33 which is screwed tight into the ring 28. This movement of the pins 27, 27' and 27'' swings out the mid-portions of the levers 37, 37' and 37'', causing their brackets 137, 137' and 137'' to extend out beyond the circle 110 and provide a seating surface for the reel 5 as shown in FIG. 8.

A reel 5, identical with the lower reel 4, can now be mounted on the hub 10 with its bottom rim on the segment tabs 137, 137' and 137''. When the reel 5 passes over the spring-loaded sliders 41, the latter are radially shifted inwards and bear against an oblique plane 44, through the rollers 42. The oblique plane 44 is provided on the ring 43, which is lifted by the action just described. The ring 43 then lifts the spring-pressed locking pins 27 to such an extent that their connection with the ring 33 of the lower hub 8 is released. The two hubs 8 and 10 can thereafter, during operation of the magnetic tape apparatus, be driven independently from each other by the respective motors 2 and 3. The two locking pins 26 are also lifted with the lifting ring 43. These pins 26 by virtue of a previous operation have produced a fixed connection between the hub 10 and the central grip nut 25. Now, with rotation of the grip nut 25 clockwise relative to the hub 10, in the same way as already described for the hub 8, the hold-down cams 39 corresponding to the cams 30 for the hub 8, and the swinging segments 40 corresponding to the segments 30 already described will be swung out and by further rotation of the grip nut 25. By screwing in the ring 45 together with the nut 25 into the internal threads of the hub 10 the elements 39 will be lowered on the reel rim to clamp the reel fast. In order to prevent, during the clamping operation, the hub 10 from turning by more than a few degrees of angle, spring loaded blocking fins 23 are provided, just as in the case of the lower hub, one of which engages in a corresponding groove of the reel 5.

Figure 4:
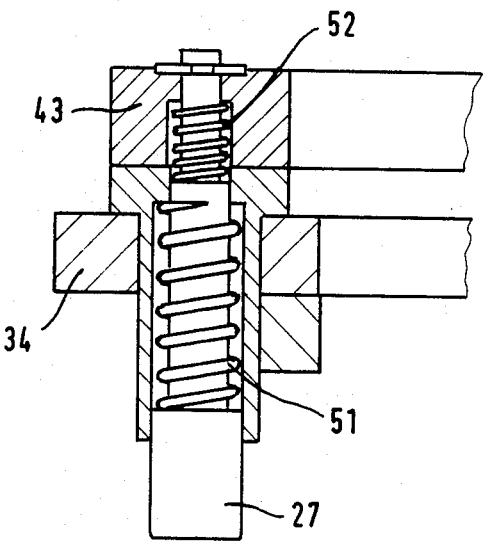
FIG. 4 is a detailed view of one of three longitudinally movable locking pins, in side view with other parts shown in section, all shown on a larger scale.

FIG. 4 shows on an enlarged scale the disposition of a locking pin 27 in the actuating ring 34. The springs 51 and 52 give the pins 27 different degrees of freedom with respect to the rings 34 and 43 (the ring 43 being the lifting ring previously described that is operated by the inclined plane 44). For the removal of the reels 4 and 5 from the hubs 8 and 10 respectively the operating movements are the reverse of those described for clamping them in place. By holding the upper reel fast while rotating the central grip nut 25 counterclockwise, what happens first is that the hold-down elements 39 projecting from the segments 40 are raised in accordance with the thread pitch of the internal threading of the hub 10, after which they are swung inwards with further rotation of the central grip nut 25. The reel 5 can then be lifted off the hub 10. In this operation the sliders 41 slide outwardly under the influence of the spring bias of the springs 51 in connection with the effect of the oblique plane 44, as the result of which the ring 43 returns to its initial position and the locking pins 27 are spring pressed against the surface of the ring 33. If now the reel 4 is held fast and the central grip nut 25 rotated further, clockwise, the pins 27 catch in the bores 31 of the ring 33 after at most 60° relative rotation between the two hubs 8 and 10 and prevent any further relative rotation of the two hubs. With the lowering of the ring 43 the interlock pins 26 are also lowered and catch in the previously described cavities of the central grip nut 25. The transfer of torque from the grip nut 25 to the ring 33 is thereby enabled and the ring 33 will be lifted in accordance with its threading pitch with further counterclockwise rotation of the grip nut 25. At the same time the hold-down elements 30 projecting from the circular segments 29 will be moved to such an extent circumferentially, by movement of their ends opposite their pivot points that the hold-down elements 30 become flush with the outer diameter of the hub 8. In this manner a drive and attachment device for coaxially mounted tape reels is provided in which all the elements necessary for attaching and securing the tape reels in place are disposed in a circle around a central cavity in the middle of which the drive motors are located and which provides the necessary space, also, for the drive gears.

The parts of the illustrated device which are provided in accordance with the invention, for making possible the mounting and securing of tape reels in place and their removal without taking up space necessary for the motors and drive gears, have been explained in detail in the foregoing description, but it is evident from FIG. 1 and FIG. 2 that other features, not necessary for the practice of the invention are also incorporated in the illustrated embodiment, so that some further elucidation is desirable. Thus, the ring 100 in FIG. 2 carries an internal pulse counting ring 101 which may be a toothed ring or a ring providing alternating reflecting and absorbing elements for operation of a pulse counting device for the motor by which its speed can be controlled. A mounting 105 holds a structure 106 containing a small light source, not shown on the drawing, illuminating the alternating segments of the counting ring 101 and also a photo cell, not shown, which picks up successive reflections from the reflecting portions of the ring 101 to produce speed control or measuring pulses.

The semicircular arcuate segments 29 which serve to hold down and clamp the top surfaces of a reel are pivoted at 91 at one end and at the other end have a stud on the side of the segments away from the plane of the drawing centered on the cross mark 92 which projects into a slot 93 of the underlying structure in the position shown the inward cams 94 ride on the ring 33, forcing out the hold-down lips 30 and pulling the free ends of the segments 29 as far as they are permitted to move by the slots 93. When the grip nut 25 is rotated so as to release the reels from the hubs, the inward cams 94 fall into the depressions 95 in the outer edge of the ring 33. The cams 30 are then withdrawn inwards so that they become flush with the hub contour and the free ends of the segments 29 push over as close to the pivot end of the other segments 29 as the slots 93 will permit.

It has already been mentioned that the structure of the segments 29 and the hold-down lips 30 is repeated for the upper hub by the lips 39 and the segments 40. On the latter the pins 98 and 99, respectively fitting into a pivot bore and into a slot, appear. The corresponding slots 93 and bores 97 are illustrated as going into the hub 10, but it will be seen from FIG. 1 that the upper part of the hub 10, and likewise the upper part of the hub 8 has a number of rings set internally therein, below the segments 40 in the case of the hub 10 and the segments 29 in the case of the hub 8, as may be necessary to make use of internal threading for holding the various elements firmly together.

Figure 3:
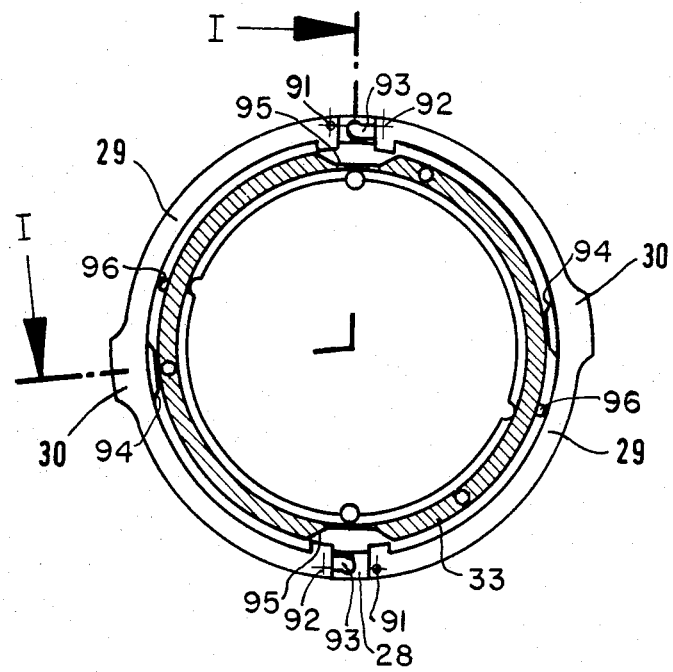
FIG. 3 is a top view, partly in section, of a pair of one-armed levers and a few parts cooperating therewith.

It should also be noted in FIG. 3 that stop pins 96 are provided to prevent excessive relative rotation of the rings 33 and the segments 29 and their underlying support beams 28. Finally, it should be noted that FIG. 1 is not a section along a diametral plane, but rather, as indicated by the section line I—I in FIG. 3, the left half of FIG. 1 is a section along a plane passing through the axis of the motor shaft and also through the ends of the slots 93 about where the middle of the pins 99 (see FIG. 1) are located when the lips 30 are withdrawn. The right-hand half of the section shown in FIG. 1 is on a plane at about 110° thereto, which passes through the axis of the motor shaft and through the middle of the lips 30 when they are in their protruded position. This was done so as to show a lip 30 and a lip 39 in the right-hand portion of FIG. 1 and to show the gap between the segments 29 and between the segments 40 in the left-hand portion of FIG. 1.

Thus, only the fins 23 at one end of the respective two spring rings are shown in FIG. 1. The diametrically opposite end, with its fin 23 is shown in FIG. 5c.

Although the invention has been described with reference to a particular illustrative embodiment, it will be understood that variations and modifications are possible within the inventive concept.

I claim:

1. Combined driving and mounting device for first and second tape reels for a machine in which said tape reels are used in coaxial alignment, each reel having its individual motor and drive and being mountable on respective first (10) and second (11) hollow hub structures aligned on a common axis, said hub structures together substantially surrounding said drives (12, 13; 6, 7) and at least a portion of each of said motors (2, 3) and having cylindrical outer surfaces for centering said reels, said second hub structure (8) having, at its axial end facing away from said first hub structure (10), at least one support element affixed thereto (21) for said second reel, said support element protruding radially from said cylindrical surface of said second hub structure, said device further comprising:

a rotary actuating control crown (25) centered on said common axis and fitting within and protruding from the end of said first hub structure (10) facing away from said second hub structure (8), said control crown (25) being mounted so as to permit control rotation thereof relative to at least said first hub structure (10);

a first set (37, 37', 37'') of a plurality of arc-shaped single-arm levers and a lever support ring (35) therefor on which said levers of said first set are pivoted at one end of said respective levers, said lever support ring (35) being disposed at the end of said first hub structure (10) facing said second hub structure (8) and said levers providing movable support elements (137,137', 137'') for said first reel (5), a mechanical linkage (27, 27', 27'', 34, 43) being provided between said control crown (25) and said levers of said first set for making said support elements movable radially so as to be selectively protruding radially from and withdrawn radially within a circle concentric with said cylindrical surface of said first hub structure;

first (45) and second (28) threaded clamp support rings screwed respectively interiorly into said first (10) and second (8) hub structures, said first support ring being at the end of said first hub structure facing away from said second hub structure and said second support ring being at the end of said second support structure facing said first support structure, each said clamp support ring having a pair of arc-segmental single-arm levers (29, 40) pivoted thereon at diametrically opposite positions on said ring and a pin-and-guideway circumferentially sliding positioning engagement (97, 98; 93, 99) for the respective ends of said levers opposite their pivoted ends, said levers (29, 40) of said clamp support rings having protrusions (30, 39) in their mid-portions;

rotary cam and follower mechanisms (95) for each of said clamp support rings for selectively urging outward said protrusions of levers of the respective rings in response to an initial rotation of the respective ring relative to the respective hub structure in which the ring is threaded produced by actuation of said control crown (25), said control crown being actuatable further for clamping a reel by means of said protrusions in response to further rotation of the respective ring in its threaded mounting, said control crown (25) being similarly actuatable in the reverse direction for unclamping the reel and for permitting said protrusions to spring back to a position clearing the respective hub structure for axial removal of a reel.

2. Combined driving and mounting device for first and second tape reels for a machine in which said tape reels are used in coaxial alignment, each reel having its individual motor and drive and being mountable on respective first (10) and second (11) hollow hub structures aligned on a common axis, said hub structures together substantially surrounding said drives (12, 13; 6, 7) and at least a portion of each of said motors (2, 3) and having cylindrical outer surfaces for centering said reels, said second hub structure (8) having a ring (33) fixed therein and having, at its axial end facing away from said first hub structure (10), at least one support element affixed thereto (21) for said second reel, said support element protruding radially from said cylindrical surface of said second hub structure, said device further comprising:

a rotary actuating control crown (25) centered on said common axis and fitting within and protruding from the end of said first hub structure (10) facing away from said second hub structure (8), said control crown (25) being mounted so as to permit control rotation thereof relative to at least said first hub structure (10);

a set (37, 37', 37") of three arc-shaped single-arm levers and a lever support ring (35) therefor on which said levers of said set are pivoted in a close overlapping array at one end of said respective levers, the non-pivoted ends of said levers having hook-like lateral sockets, said lever support ring (35) being disposed at the end of said first hub structure (10) facing said second hub structure (8) and said levers providing movable support elements (137, 137', 137") for said first reel (5), a mechanical linkage including rings (34, 43) and three pins (27, 27', 27") being provided between said control crown (25) and said three levers of said set for extending said pins through said hook-like sockets and for engaging said pins into said ring fixed in said second hub structure when said second reel is clamped thereon, for spreading said reel support elements apart by acting on said three levers of set sent in response to actuation of said control crown (25) relative to said second hub structure (8);

first (45) and second (28) threaded clamp support rings screwed respectively interiorly into said first (10) and second (8) hub structures, said first support ring being at the end of said first hub structure facing away from said second hub structure and said second support ring being at the end of said second support structure facing said first support structure, each said clamp support ring having a pair of arc-segmental single-arm levers (29, 40) pivoted thereon at diametrically opposite positions on said ring having radially outward protrusions (30, 39) in their respective mid-portions, and means (97, 98; 93, 99; 95) for causing said levers of said pair to bow outward and to extend said protrusions radially beyond the cylindrical surfaces of said hub structures in response to an initial rotation of the respective ring relative to the respective hub structure in which the ring is threaded, produced by actuation of said control crown (25), said control crown being actuatable further for clamping a reel by means of said protrusions in response to further rotation of the respective ring in its threaded mounting, said control crown (25) being similarly actuatable in the reverse direction for unclamping the reel and for permitting said protrusions to spring back to a position clearing the respective hub structure for axial removal of a reel.

* * * * *